(12) United States Patent
Yeh

(10) Patent No.: US 9,398,671 B2
(45) Date of Patent: Jul. 19, 2016

(54) CONTROL DEVICE WITH LIGHT ADJUSTMENT FUNCTION

(71) Applicant: LEXTAR ELECTRONICS CORPORATION, Hsinchu (TW)

(72) Inventor: Chien-Nan Yeh, Kaohsiung (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 14/248,274

(22) Filed: Apr. 8, 2014

(65) Prior Publication Data

US 2015/0173136 A1    Jun. 18, 2015

(30) Foreign Application Priority Data

Dec. 17, 2013    (TW) .............................. 102146526 A

(51) Int. Cl.
*H05B 37/02*    (2006.01)
*H05B 33/08*    (2006.01)

(52) U.S. Cl.
CPC ........ *H05B 37/0281* (2013.01); *H05B 33/0815* (2013.01); *Y02B 20/42* (2013.01)

(58) Field of Classification Search
CPC ............. H05B 33/086; H05B 33/0863; H05B 37/0281
See application file for complete search history.

(56) References Cited

U.S. PATENT DOCUMENTS

| | | | | | |
|---|---|---|---|---|---|
| 4,038,561 | A * | 7/1977 | Lorenz | ................... | G04C 21/00 307/141 |
| 5,381,074 | A * | 1/1995 | Rudzewicz | ............ | B60Q 3/001 307/10.8 |
| 6,501,237 | B2 * | 12/2002 | Davies | ............... | H05B 37/0281 315/247 |
| 7,942,553 | B2 * | 5/2011 | Huang | ............... | H05B 33/0815 362/202 |
| 8,044,608 | B2 * | 10/2011 | Kuo | .................... | H05B 33/0815 315/291 |
| 8,970,130 | B1 * | 3/2015 | So | .......................... | F21S 6/002 315/297 |
| 2008/0192499 | A1 * | 8/2008 | Gardner | ............... | B60Q 3/0293 362/488 |
| 2011/0018467 | A1 * | 1/2011 | Tzeng | .................... | H05B 37/02 315/307 |
| 2012/0242247 | A1 * | 9/2012 | Hartmann | .......... | H05B 33/0863 315/294 |
| 2014/0035475 | A1 * | 2/2014 | Suh | ..................... | H05B 33/0848 315/200 R |
| 2014/0049971 | A1 * | 2/2014 | McGuire | ............... | F21V 23/003 362/382 |
| 2014/0077707 | A1 * | 3/2014 | Restrepo | ............ | H05B 37/0272 315/158 |
| 2014/0300274 | A1 * | 10/2014 | Acatrinei | .......... | H05B 33/0815 315/85 |
| 2015/0054413 | A1 * | 2/2015 | Chen | .................. | H05B 33/0833 315/155 |
| 2015/0091451 | A1 * | 4/2015 | Williams | ................ | H02J 9/065 315/160 |

* cited by examiner

*Primary Examiner* — Jason M Crawford
*Assistant Examiner* — Kurtis R Bahr

(57) ABSTRACT

A control device including a first switch, a control unit and a second switch is provided. When the first switch is turned on, a power signal generated by a power supply is transmitted to a lighting load via the first switch. The brightness of the lighting load is gradually increased or reduced as time increases. When the first switch is turned on, the control unit executes a countdown according to a time value. Upon finishing the countdown, the control unit generates a trigger signal and simultaneously the brightness of the lighting load is at a set value. When receiving the trigger signal, the second switch stops transmitting the power signal from the first switch to the lighting load at first and then transmits the power signal from the first switch to the lighting load such that the brightness of the lighting load keeps at the set value.

10 Claims, 3 Drawing Sheets

CONTROL DEVICE WITH LIGHT ADJUSTMENT FUNCTION

CROSS REFERENCE TO RELATED APPLICATIONS

This Application claims priority of Taiwan Patent Application No. 102146526, filed on Dec. 17, 2013, the entirety of which is incorporated by reference herein.

BACKGROUND OF THE INVENTION

1. Field of the Invention

The invention relates to a control device, and more particularly to a control device with light adjustment function.

2. Description of the Related Art

In current lighting systems, cold cathode fluorescent lamps (CCFLs) are commonly used. However, since light-emitting diodes (LEDs) possess advantages over CCFLs, such as having low power consumption, long service life, and high efficiency, LEDs have become widely used in recent years. In a conventional LED lighting system, a phase cut-off dimmer, such as a TRIAC is utilized to adjust the brightness of the LED. However, the power consumption of the phase cut-off dimmer is high and it has an electromagnetic disturbance (EMI) issue. Therefore, the phase cut-off dimmer influences the efficiency of the LED lighting system.

BRIEF SUMMARY OF THE INVENTION

In accordance with an embodiment, a control device has a light adjustment function and is coupled between a power supply and a lighting load. The control device comprises a first switch, a timing setting unit, a control unit and a second switch. The first switch is coupled to the power supply. When the first switch is turned on, a power signal generated by the power supply is transmitted to the lighting load via the first switch. The brightness of the lighting load is gradually increased or reduced as time increases. The timing setting unit is configured to set a time value. The control unit is coupled to the timing setting unit. When the first switch is turned on, the control unit executes a countdown according to the time value. Upon finishing the countdown, the control unit generates a trigger signal and simultaneously the brightness of the lighting load is at a set value. The second switch is coupled between the control unit, the first switch, and the lighting load. When the second switch receives the trigger signal, the second switch stops transmitting the power signal from the first switch to the lighting load at first and then transmits the power signal from the first switch to the lighting load such that the brightness of the lighting load keeps at the set value.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
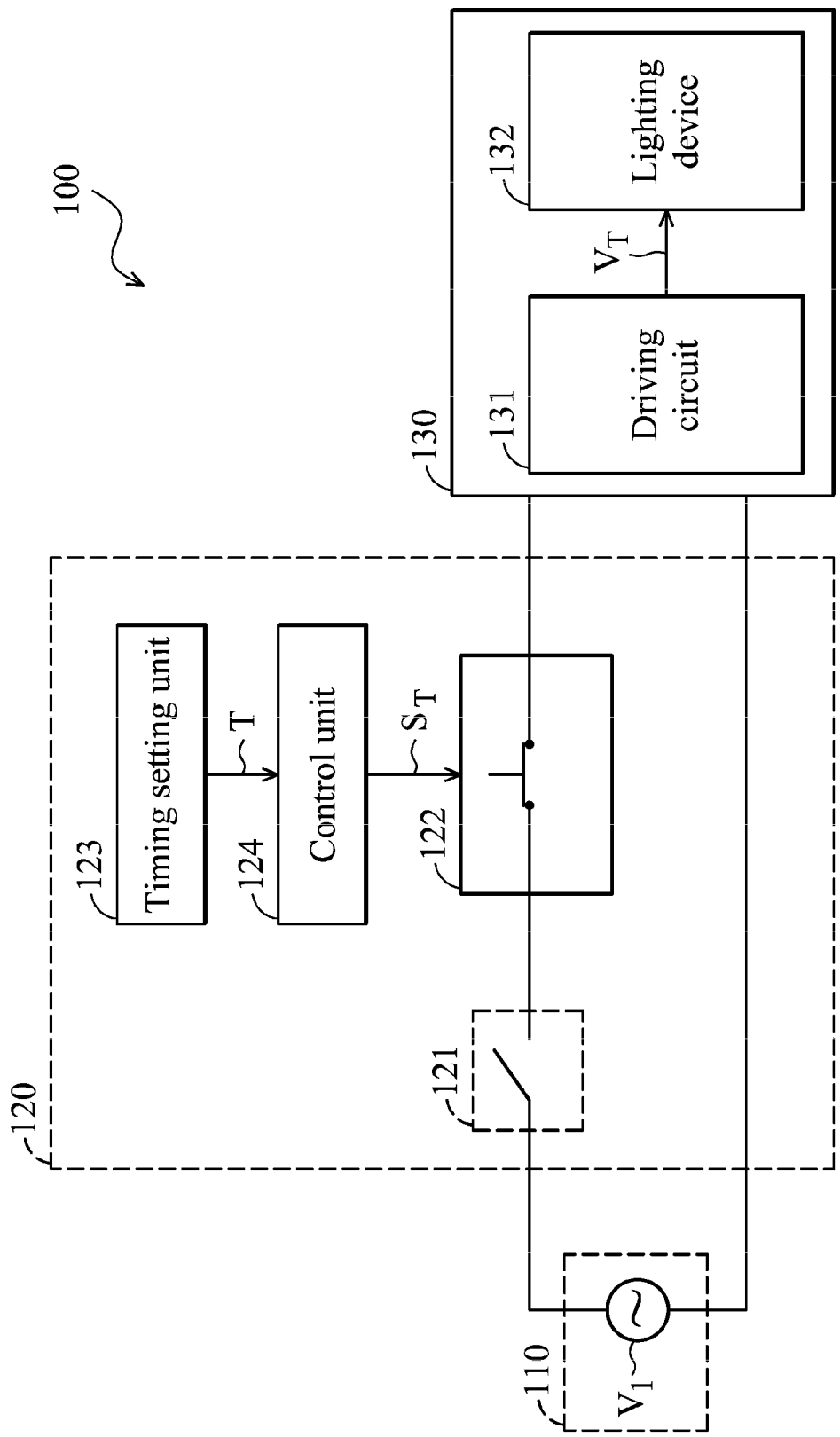
FIG. 1 is a schematic diagram of an exemplary embodiment of lighting system.

FIG. 1 is a schematic diagram of an exemplary embodiment of lighting system. The lighting system 100 comprises a power supply 110, a control device 120 and a lighting load 130. The power supply 100 is configured to provide a power signal $V_1$. The invention does not limit the kind of power signal $V_1$. In this embodiment, the power signal $V_1$ is an alternating current (AC) signal. In some embodiments, the power signal $V_1$ is a direct current (DC) signal.

The control device 120 has a light adjustment function. The control device 120 is coupled between the power supply 110 and the lighting load 130 to adjust the brightness of the lighting load 130. The control device 120 can be integrated with the lighting load 130 or disposed the outside of the lighting load 130. In this embodiment, the control device 120 comprises switches 121, 122, a timing setting unit 123 and a control unit 124.

The switch 121 is coupled to the power supply 110 to transmit the power signal $V_1$. When the switch 121 is turned on, the switch 121 transmits the power signal $V_1$ generated from the power supply 110 to the lighting load 130. The invention does not limit the kind of switch 121. The switch 121 may be a digital switch or a machine switch. In one embodiment, the switch 121 is a machine button. In this embodiment, the brightness of the lighting load 130 is gradually increased or reduced as time increases.

The timing setting unit 123 is configured to set a time value T, wherein T>0. In one embodiment, the timing setting unit 123 comprises a button body (not shown). A user adjusts the button body to set the time value T. The details of the timing setting unit 123 will be described in greater detail with reference to FIGS. 2 and 3.

The control unit 124 is coupled to the timing setting unit 123. When the switch 121 is turned on, the power signal $V_1$ generated by the power supply 110 is transmitted to the lighting load 130 via the switch 121 such that the lighting load 130 shines. The user may utilize the timing setting unit 123 to set the time value T. The control unit 124 executes a countdown according to the time value T. Upon finishing the countdown, the control unit 124 generates a trigger signal $S_T$. Additionally, since the brightness of the lighting load 130 is gradually increased or reduced with the increase of time, when the control unit 124 executes the countdown, the brightness of the lighting load 130 varies with time. Once the control unit 124 finishes the countdown, the brightness of the lighting load 130 is at a set value $L_T$.

The invention does not limit the circuit structure of the control unit 124. In one embodiment, the control unit 124 is constituted by a hardware structure comprising various micro-processors, micro-controllers, logic circuits, memories or other integrated circuits. In another embodiment, the control unit 124 is a programming code stored in a memory. The programming code is executed to complete the countdown and the method of generating the trigger signal.

The switch 122 is coupled between the control unit 124, the switch 121 and the lighting load 130. The invention does not limit the kind of switch 122. In one embodiment, the switch 122 is a normally closed relay. Therefore, when the switch 121 is turned on, the power signal $V_1$ generated by the power supply 110 is transmitted from the switches 121 and 122 to the lighting load 130. However, when the switch 122 receives the trigger signal $S_T$, the switch 122 is turned off. Therefore, the power signal $V_i$ is not transmitted to the lighting load 130. Then, the switch 122 is turned on such that the power signal $V_1$ is transmitted to the lighting load 130 via the switches 121 and 122. Therefore, the lighting load 130 shines again. In this embodiment, the brightness of the lighting load 130 is maintained at the set value $L_T$.

For example, assume that the brightness of the lighting load 130 is gradually increased as time increases, and the time value T is set to 10 seconds. In other words, the control unit 124 counts down 10 seconds and the brightness of the lighting load 130 is gradually increased during the 10 seconds. Assuming that the brightness of the lighting load 130 is at a set value $L_T$ at 10th second, after the control unit 124 counts down 10 seconds, the brightness of the lighting load 130 reaches the set value $L_T$. At this time, the control unit 124 generates a trigger signal $S_T$ to the second switch 122. The switch 122 first stops transmitting the power signal $V_1$ to the lighting load 130 such that the power signal $V_1$ does not pass through the first switch 121. At this time, the lighting load 130 does not shine. Then, the switch 122 is turned on immediately such that the power signal $V_1$ is transmitted to the lighting load 130 via the switches 121 and 122 such that the lighting load 130 shines again and maintains the brightness at the set value $L_T$, which recently appears at the 10th second before the lighting load 130 stops receiving the power signal $V_1$.

In this embodiment, the lighting load 130 comprises a driving circuit 131 and a lighting device 132. The driving circuit 131 is electrically coupled between the switch 122 and the lighting device 132. When the switch 121 is turned on, the driving circuit 131 receives the power signal $V_1$ provided by the power supply 110 via the switches 121 and 122 such that the lighting device 132 is driven to shine. The invention does not limit the kind of lighting device 132. In one embodiment, the lighting device 132 comprises at least one light-emitting diode (LED).

In another embodiment, when the switch 122 stops transmitting the power signal $V_1$ according to the trigger signal $S_T$, the driving circuit 131 records a driving voltage $V_T$ which is a voltage provided to the lighting device 132 to produce the brightness with the set value $L_T$. In other words, when the lighting device 132 receives the driving voltage $V_T$, the brightness of the lighting device 132 is at the set value $L_T$. Then, the switch 122 is immediately turned on such that the driving circuit 131 outputs the recorded driving voltage $V_T$. Therefore, the brightness of the lighting device 132 keeps at the set value $L_T$.

Figure 2:
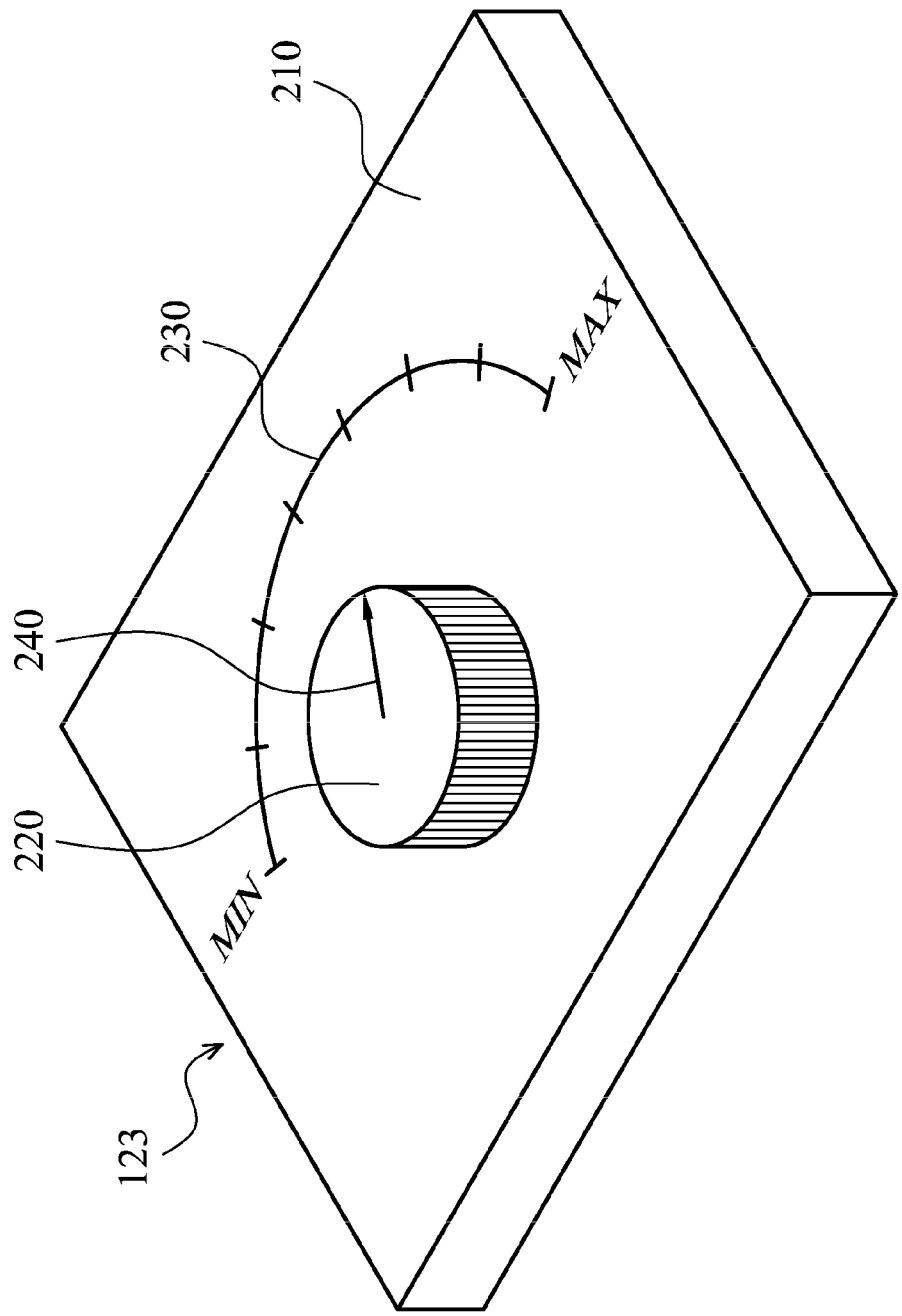
FIG. 2 is a schematic diagram of an exemplary embodiment of a timing setting unit.

FIG. 2 is a schematic diagram of an exemplary embodiment of a timing setting unit. The timing setting unit 123 is a rotational switch comprising a panel 210, a button body 220 and a timing scale 230. The button body 220 and the timing scale 230 are disposed on the panel 210. Furthermore, an indicator 240 is formed on the button body 220. For setting the time value T, a user rotates and adjusts the button body 220 such that the indicator 240 aims a position of the timing scale 230. In this embodiment, the time value T provided by the timing setting unit 123 relates to the position of the timing scale 230 aimed by the indicator 240.

For example, assume that the timing scale 230 relates to the length of time. When the user rotates the button body 220 and the indicator 240 aims the leftmost side of the timing scale 230, the time value T is a minimum value MIN, such as 0 s. When the user rotates the button body 220 and the indicator 240 aims the rightmost side of the timing scale 230, the time value T is a maximum value MAX, such as 10 s. When the indicator 240 aims a position between the MIN and MAX, the time value T is within 0 s~10 s.

Figure 3:
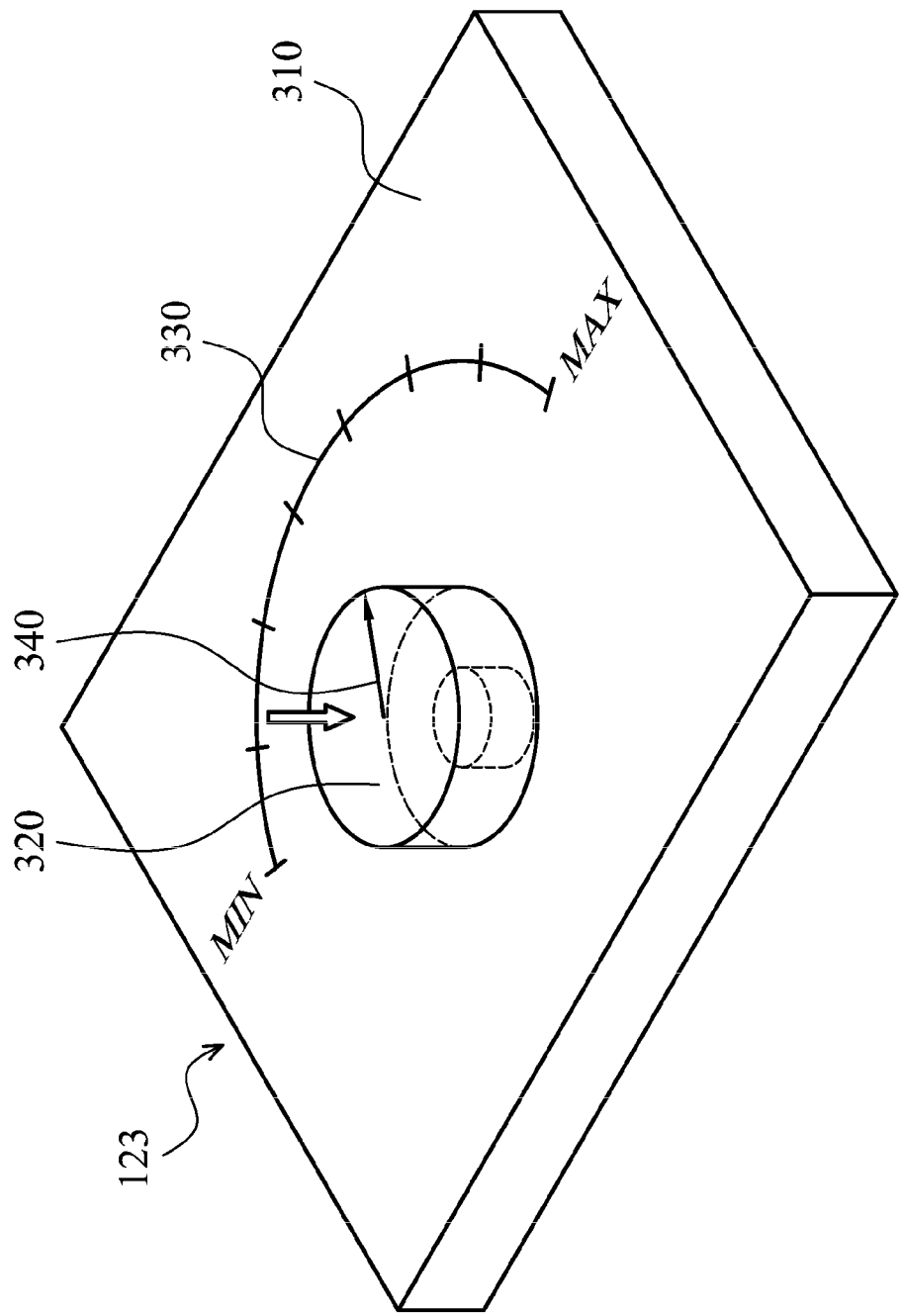
FIG. 3 is a schematic diagram of another exemplary embodiment of a timing setting unit.

FIG. 3 is a schematic diagram of another exemplary embodiment of the timing setting unit. The timing setting unit 123 comprises a panel 310, a single button body 320 and a timing scale 330. The button body 320 can be pressed and and rotated. An indicator 340 is set on the button body 320. The timing scale 330 is disposed on the panel 310. In this embodiment, the switch 121 and the timing setting unit 123 are integrated into a complex switch comprising a button body 320 with a push-down function and a rotation function. The user rotates the button body 320 to set the time value T and presses the button body 320 vertically to turn on/off the lighting load 130. Therefore, the button body 320 serves as a main switch.

Referring to FIG. 1, when the user presses the button body 320, the switch 121 is turned on such that the power signal $V_1$ generated by the power supply 110 is transmitted to the lighting load 130 via the switch 121. After the switch 121 is turned on, the button body 320 is rotated to set the time value T. Since the user can utilize the timing setting unit 123 to set the brightness of the lighting device 132, when the button body is not rotated, the brightness of the lighting device 132 is at the the same value, such as the set value $L_T$. In another embodiment, when the user presses the button body 320 again, the switch 121 is turned off such that the power signal $V_1$ is not transmitted to the lighting load 130.

In one embodiment, the timing setting unit 123 shown in FIG. 2 or 3 is disposed on the wall. Additionally, the lighting load 130 is a lamp suspended from the ceiling. In one embodiment, when the control unit 124 counts down according to the time value T, the button body 220 or 320 automatically revolves back to the minimum value MIN of the timing scale 230 or 330, such as 0 seconds.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control device with a light-adjustment function coupled between a power supply and a lighting load, comprising:

a first switch coupled to the power supply, wherein when the first switch is turned on by a user, a power signal generated by the power supply is transmitted to the lighting load via the first switch, and the brightness of the lighting load is gradually increased or reduced as time increases;

a timing setting switch configured to set a time value by the user independently of the first switch;

a control unit coupled to the timing setting switch, wherein when the first switch is turned on, the control unit executes a countdown according to the time value during which time the brightness of the lighting load is gradually increased or reduced, and upon finishing the countdown, the control unit generates a trigger signal and simultaneously the brightness of the lighting load is at a set value; and a second switch coupled between the control unit, the first switch and the lighting load, wherein when the second switch receives the trigger signal, the second switch automatically stops transmitting the power signal from the first switch to the lighting load, and then immediately transmits the power signal from the first switch to the lighting load such that the brightness of the lighting load is at the set value.

2. The control device as claimed in claim 1, wherein the lighting load comprises:

a lighting device; and a driving circuit electrically coupled between the second switch and the lighting device, wherein when the first switch is turned on, the driving circuit receives the power signal passing through the first and second switches to drive the lighting device such that the lighting device shines.

3. The control device as claimed in claim 2, wherein when the second switch stops transmitting the power signal according to the trigger signal, the driving circuit records a driving voltage which is used to drive the lighting device to shine at the set value, and when the second switch is turned on, the driving circuit provides the driving voltage to the lighting load such that the brightness of the lighting load is at the set value.

4. The control device as claimed in claim 1, wherein the timing setting switch comprises a button switch configured to set the time value.

5. The control device as claimed in claim 1, wherein the first switch is a digital switch or a machine switch.

6. The control device as claimed in claim 5, wherein the machine switch is a machine button.

7. The control device as claimed in claim 1, wherein the first switch and the timing setting switch are integrated in a complex switch comprising a button body with a push-down function and a rotation function, and when the button body is pressed, the first switch is turned on, and the time value is set by rotation of the button body.

8. The control device as claimed in claim 1, wherein the second switch is a normally closed relay.

9. The control device as claimed in claim 8, wherein the lighting device comprises a light-emitting diode (LED).

10. The control device as claimed in claim 9, wherein the power signal is an alternating current (AC) signal.

* * * * *